June 26, 1928.
J. J. STOETZEL
1,675,003
CONTROL VALVE DEVICE FOR PNEUMATIC DISPATCH SYSTEMS
Filed July 19, 1927    2 Sheets-Sheet 1
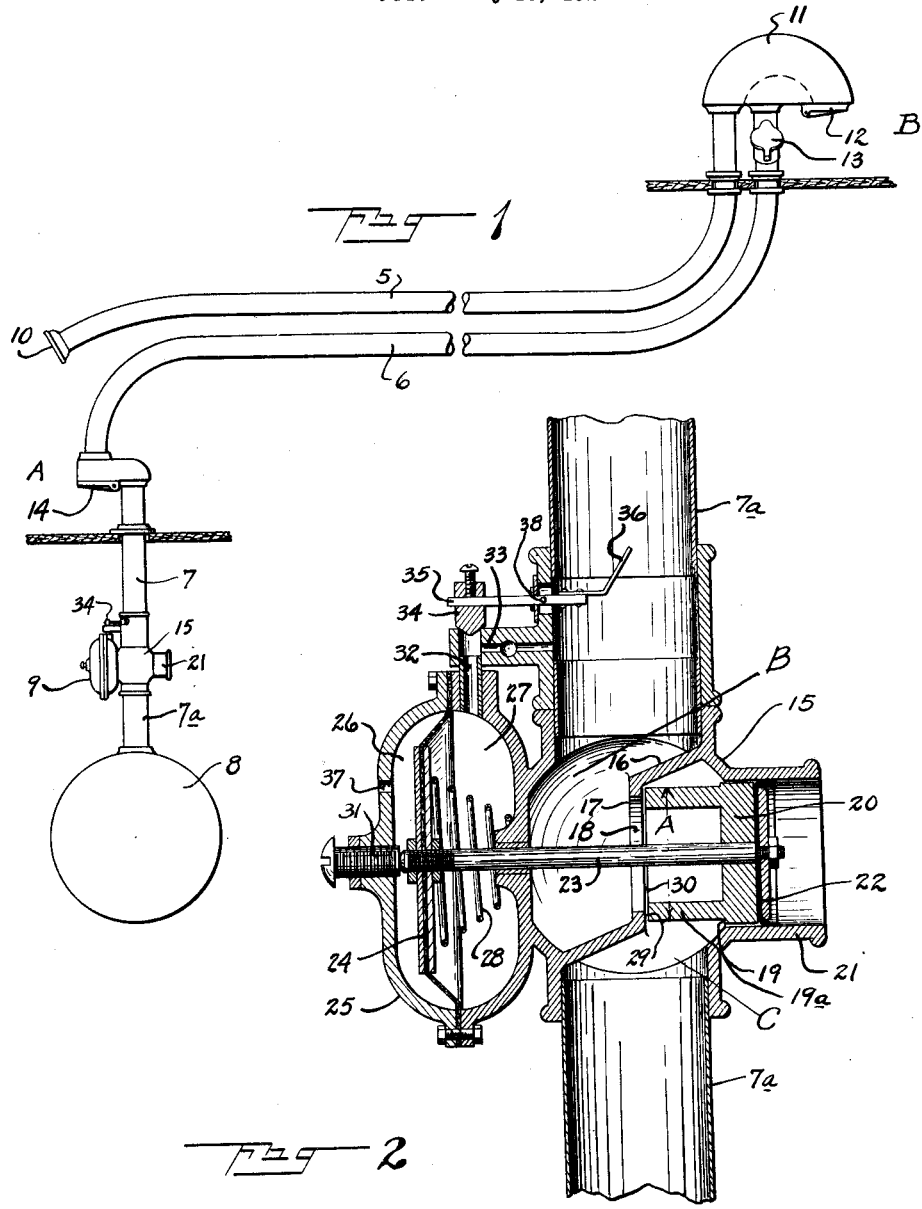
INVENTOR.
Joseph J. Stoetzel
BY Merrell E. Clark
ATTORNEY June 26, 1928.  
J. J. STOETZEL  
1,675,003  
CONTROL VALVE DEVICE FOR PNEUMATIC DISPATCH SYSTEMS  
Filed July 19, 1927  
2 Sheets-Sheet 2

INVENTOR.  
Joseph J. Stoetzel  
BY Merrell C. Clark  
ATTORNEY

Patented June 26, 1928.

1,675,003

UNITED STATES PATENT OFFICE.

JOSEPH JOHN STOETZEL, OF QUEENS, NEW YORK, ASSIGNOR TO G. & G. ATLAS SYSTEMS, INC., OF NEW YORK, N. Y., A CORPORATION OF NEW YORK.

CONTROL-VALVE DEVICE FOR PNEUMATIC-DISPATCH SYSTEMS.

Application filed July 19, 1927. Serial No. 206,809.

This invention relates generally to pneumatic dispatch apparatus of the type in which a minimum flow of air through the transmission lines is provided between carrier movements.

A general object of the invention is to provide an improved controlling device for automatically bringing about a carrier propelling flow of air in the transmission lie upon the insertion of a carrier in the mouth of the tube at the transmission end and, on the other hand, the immediate establishing in the transmission line of a reduced or minimum flow of air upon the discharge of the carrier from the delivery end of the transmission.

With this general object in view, the invention comprises a controlling valve structure in which a valve member, having its outer surface constantly open to atmosphere, is arranged in cooperative relation to a port formed for the purpose in a partition or septum member formed in a section of the tube structure. The valve thus provided is arranged in its opening movement to move away from the port in the same direction as that of the flow of air therethrough and in its normal or closed position the valve occupies a position slightly spaced from the valve seat in order to provide for the minimum flow of air referred to. The valve member is connected through a rod or stem, extending across the valve section, to a diaphragm open at its outer surface to atmosphere. The chamber in which the diaphragm is mounted communicates at the inner side of the diaphragm with the interior of the tube section on the transmission tube side of the valve. A spring or equivalent device is mounted for engagement with the inner face of the diaphragm to normally urge the diaphragm to a position in which the valve will be brought to a closed relation to the port.

The valve structure and diaphragm actuating means described are controlled by means of a member sensitive to the kinetic energy of air flowing through the transmission tube, that is, to a surge or rush of air through the tube, such as is produced by the release of the partial vacuum condition obtaining while a carrier is traversing the transmission line.

Other features of the invention will be hereinafter referred to.

In the drawings, in which a number of embodiments of the invention have been selected for illustration:

Figure 1 is a diagrammatic view of a single operating unit of a pneumatic dispatch system equipped with a controlling device embodying the invention;

Figure 2 is a view on an enlarged scale and in vertical section of the control device shown in Figure 1;

Figure 3:
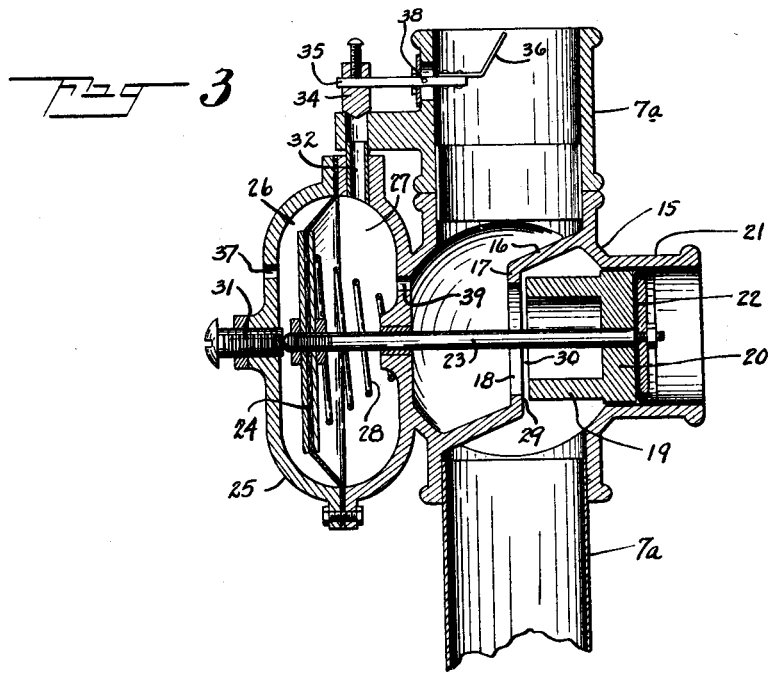
Figure 3 is a view similar to Figure 2 of a modified form of the invention showing the valve member in its closed position.

Referring to the drawings for a more detailed description of the invention, in Figure 1 there is shown a transmission line unit of a pneumatic dispatch system which includes a station A and a station B connected by a transmission tube 5 through which carriers are transmitted from station A to station B and a transmission tube 6 through which carriers are transmitted from station B to station A. The terminal portion 7 of transmission tube 6 is connected through a conduit 7ª with a source of suction or exhaust 8 in which is mounted a control device 9 which forms the subject matter of the invention herein described.

The transmission tube 5 is provided at station A with an open bell mouth end 10 into which carriers may be inserted for dispatch to station B. At station B a hood-like member 11 forms a communication between the adjacent ends of transmission tube 5 and transmission tube 6 so that suction applied to the terminal portions 7 of the tubes 6 results in the flow of air through both tubes 5 and 6, the air entering tube 5 at bell mouth 10 for eventual delivery into the suction drum 8. At station B the hook or cap member 11 is provided with an outwardly opening hinged closure member or gate 12 which permits of the discharge of carriers at station B after their travel through the transmission tube 5 from station A. Transmission tube 6 is provided at station B with a hinged gate member 13 which can be manually opened to permit of the insertion of a carrier into the tube 6, the carrier being discharged from the other end of the tube at station A by way of a hinged gate member 14. The organization of structure thus far described is in extensive use and forms no part in itself of the invention hereinafter claimed.

In order to conserve power by doing away with a full flow of air through the transmission line during periods when carriers are not being transmitted therethrough, the control devices shown generally at 9 in Figure 1 of the drawings and more specifically in Figures 2 and 3 are provided.

Referring to Figure 2 of the drawings, the control device 9 includes a valve chamber section 15 adapted to be fitted at its opposite ends to conduit 7ᵃ connecting the suction drum 8 with the terminal member 7 of the transmission line 6. The valve chamber section 15 is provided with a septum or partition member 16 having a vertical section 17 provided with a port 18 through which air may flow from the conduit section 7ᵃ above the valve control device to the conduit section below the device.

Mounted in cooperative relation to the port opening 18 in the partition member 16 is a valve member 19 having a cylindrical or cup-like formation in which a closed end member 20 is mounted in the relation of a piston to a cylindrical extension 21 of the valve chamber structure 15. The valve member 19 is equipped with a leather washer 22 which has a cup-like formation such as to prevent the leakage of air into the valve chamber 15 through the cylindrical member 21. It will be seen that this arrangement of the valve structure provides for the application to the exposed end of the valve member in the cylinder 21 of atmospheric pressure at all times.

The valve member 19 is connected through a rod or stem 23 with a diaphragm member 24 mounting in a casing 25 in such manner as to divide the casing into two compartments 26 and 27. A spring 28 mounted in compartment 27 of the casing 25 is arranged to bear against the inner face of the diaphragm 24 and to normally hold the diaphragm in its outermost position. This position of the diaphragm holds the valve in a normally closed position as is indicated in Figure 2.

In the closed position of the valve, however, the valve member 19 does not make contact with its seat 29 on the partition member 16 but is held in a slightly spaced apart relation to the seat to provide a space 30 through which a thin stream of air can pass to provide the minimum flow of air sought for in this type of pneumatic dispatch apparatus. The space or opening 30 is provided through contact of the stem 23 with a screw 31 seated in the outer wall of the diaphragm casing 25, the screw being capable of inward or outward adjustment to correspondingly vary the size of the opening 30 and the quantity of air that can pass therethrough. Control devices which permit of this reduced or minimum flow of air when no carrier is in passage are sometimes referred to as control devices of the minimum flow type, an expression that I have used with this meaning in some of the appended claims.

In the form of the invention shown in Figure 2 of the drawings, the compartment 27 of the diaphragm casing 25 is in communication by way of a vertical passage 32 and a valve controlled horizontal passage 33 with the interior of the conduit 7ᵃ above the valve structure, that is, on the side of the control valve toward the transmission line. This communication between the compartment 27 and the interior of the conduit section 7ᵃ is continuously open so that a change of pressure conditions produced in the tube section 7ᵃ is quickly reproduced in the compartment 27 of the diaphragm casing 25.

The control structure also includes a valve member 34 having sufficient mass so that gravity acts normally to hold the valve against a seat provided by the upper end of the passageway 32. The valve member 34 is mounted on an arm 35 which extends into the tube section 7ᵃ and terminates in a vane member 36 arranged to respond to a rush or surge of air downwardly through the tube section 7ᵃ.

With this organization of structure, the operation of the control device is as follows. Upon the insertion of a carrier in either transmission line at the bell mouth opening 10 of the line 5 or by way of the hinged gate 13 of the line 6, a partial vacuum is produced in the line ahead of the carrier by reason of the continued flow of air through the control device at 30 produced through the action of the source of suction at 8. This partial vacuum or drop in pressure is communicated from the interior of the tube section 7ᵃ to the compartment 27 of the diaphragm chamber 25. The drop in pressure thereby produced in the compartment 27 removes support from the corresponding face of the diaphragm member so that the pressure of atmosphere through the communicating opening 37 acts on the outer surface of the diaphragm member and forces the valve 19 from its closed relation to the port 18. The opening of the port 18 provides for a full flow of air through the port and results in the propulsion of the carrier through the transmission tube.

When the carrier thus propelled through the tube emerges at station A or B by way of discharge terminal 14 or discharge terminal 12 as the case may be, the rush or surge of air which immediately takes place acts on the vane member 36 and operates to tilt the arm 35 about its pivotal point 38 to thereby lift the valve 34 from its seat and permit outside air, that is, atmospheric pressure, to enter the compartment 27 and re-establish equal pressure conditions on opposite sides of the diaphragm 24. Upon the equalizing of pressure conditions on opposite sides of the diaphragm 24, the spring 28 acts to force the diaphragm to its outer position and move the valve member 19 to its closed position, thereby completing the cycle of operation.

When the rush of air which serves to open the valve 34 has subsided, the pressure condition in the compartment 27 remains unchanged since by this time the pressure conditions within the tube sections 7$^a$ have also been restored to normal, that is, atmospheric pressure or substantially atmospheric pressure exists within the tube 7$^a$ and within the compartment 27 thereby maintaining the parts in their normal position with the valve in closed relation to the port 18.

A feature of the invention resides in the structural arrangement whereby the valve 19 is normally held closed by the different air pressures acting upon differential areas of this valve. Thus the spring 28 is not relied upon to hold the valve closed and may be normally untensioned, thus rendering the device more sensitive.

The differential areas referred to are the area A of the front of the valve, the larger area 22 at the rear of the valve, and the area of the flange 19$^a$ representing, generally, the difference between the other two areas. With the parts in the position shown in Fig. 2, when no carrier is in the line it is obvious that the pressure in the chamber B (which communicates with the atmosphere through the tube 7$^a$), and therefore the pressure on the front end of the valve, is substantially atmospheric. Also the pressure on the opposite end 20 of the valve is atmospheric. But the pressure on the flange 19$^a$ is substantially less than atmospheric, being practically that of the chamber C which is in direct communication with the exhauster.

From the above it will be seen that in Fig. 2 there is a pressure difference tending to hold the valve closed, this difference being equal, substantially, to the difference between atmospheric pressure and the pressure within the chamber C, and being effective upon an area represented by the flange 19$^a$. The degree of holding force exerted by the pressure differential may be varied at will by changing the design of the valve 19 so as to vary the area of the flange 19$^a$.

Another advantageous feature of this structure is the housing of the spring member 28 in the diaphragm chamber rather than in the tube structure, so that the passageway through the tube is maintained in a condition unimpeded by the presence of springs or other parts which would tend to collect lint or other material which might obstruct the operation of the valve mechanism. In addition, this arrangement of structure does away with the necessity for providing means to vary the tension of the actuating spring 28 since the spring occupies an untensioned condition in one phase of its operation. Another feature of the invention resides in the simplicity of structure as a whole and the accessibility which is provided through the open cylinder extension 21 to the valve parts for any purpose.

Figure 4:
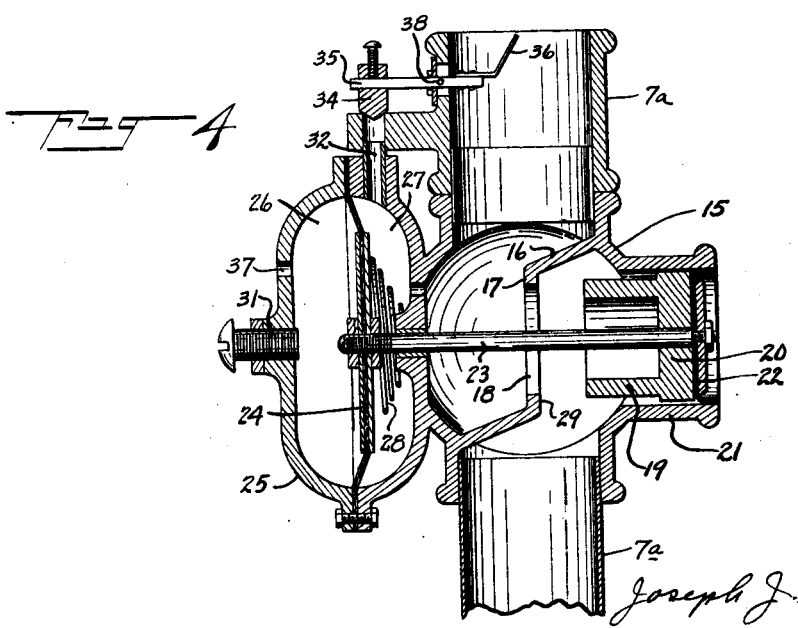
Figure 4 is a view similar to Figure 3 showing the parts arranged with the valve member in open position.

Referring to Figures 3 and 4 of the drawings, there is shown a modified form of the invention in which communication is afforded between the compartment 27 of the diaphragm casing 25 and the interior of the tube section 7$^a$ by means of a port or passage 39 provided in the inner wall of the diaphragm casing 25. The direct communication which is thus afforded between the inner compartment of the diaphragm casing and the interior of the wall chamber 15 results in a simplification of structure and operation and provides a more direct communication than is afforded in the structure shown in Figure 2.

In Figure 3 of the drawings, the valve 19 is shown in its closed position. In Figure 4 it is shown in its open position with the diaphragm 24 moved to its right hand or inner position to bring about the desired arrangement of the valve 19 with relation to the port 18.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a control device for a pneumatic dispatch transmission tube, a valve casing having a partition member provided with a port, an extension formed on the wall of the casing in alignment with the port, said extension being open at its outer end, a valve member mounted to slide in said extension toward and from said port, and diaphragm means responsive to pressure conditions in the tube for operating the valve.

2. In a control device for a pneumatic dispatch transmission tube, a valve casing having a partition member provided with a port, a cylindrical extension formed on the wall of the casing in alignment with the port, a valve member having the relation of a piston to said cylindrical extension and mounted in said extension to slide toward and from said port, and diaphragm means responsive to pressure conditions in the tube for operating the valve.

3. In a control device for a pneumatic dispatch transmission tube, a valve casing having a partition member provided with a port, a cylindrical extension formed on the wall of the casing in alignment with the port, said cylindrical extension being open at its outer end, a valve member having a piston-like relation to said cylindrical extension and mounted to slide in said cylindrical extension toward and from said port, and diaphragm means responsive to pressure conditions in the tube for operating the valve.

4. In a control device for a pneumatic dispatch transmission tube, a valve casing having a partition member provided with a port, a cylindrical extension formed on the wall of the casing in alignment with the port, a valve member mounted in a piston-like relation to said cylindrical extension and arranged to slide in said cylindrical extension toward and from said port, a diaphragm chamber mounted on the casing in a position opposite that of the cylindrical extension, a diaphragm mounted in said chamber and open to atmosphere at its exterior surface, the inner face of the diaphragm being exposed to pressure in the tube, means connecting the diaphragm and the valve member, and spring means normally moving the parts to valve closing relation.

5. In a control device for a pneumatic dispatch transmission tube, a valve casing having a partition member provided with a port, a cylindrical extension formed on the wall of the casing in alignment with the port, said cylindrical extension being open at its outer end, a valve member having the relation of a piston to said cylindrical extension and slidably movable in said extension toward and from said port, a diaphragm chamber mounted on the wall of the casing opposite the casing of the tubular extension, a diaphragm in said chamber having its outer surface exposed to atmospheric pressure, the inner surface of the diaphragm being exposed to pressure in said transmission tube, an operating connection between said diaphragm and said valve, and spring means mounted in said diaphragm chamber for normally moving the parts to valve closing position.

6. In a control device for a pneumatic dispatch transmission tube, a valve casing having a partition member provided with a port, a cylindrical extension formed on a side wall of the valve casing in alignment with said port, a piston-like valve mounted for sliding movement in said cylindrical extension toward and from said port, the outer face of said piston valve being exposed at all times to atmospheric pressure, a diaphragm chamber mounted on the wall of the casing opposite to the position of the cylindrical extension, a diaphragm mounted in said chamber and having its outer surface exposed to atmospheric pressure, the inner surface of the diaphragm being exposed to pressure in said transmission tube, an actuating rod passing through said port and connecting said diaphragm to said valve member, and a spring member enclosing said rod and mounted in said diaphragm chamber to normally press the diaphragm to a valve closing position, said valve member being arranged to move away from the port in the direction of the flow of air therethrough.

7. In a control device for a pneumatic dispatch transmission tube, a valve casing having a partition member provided with a port, a cylindrical extension formed on the wall of the casing in alignment with said port, a valve member having a piston-like formation and having an airtight fit in said cylindrical extension, the outer end of said cylindrical extension being open whereby the outer end of the valve member is exposed to atmospheric pressure, and means controlled by pressure conditions in said tube for moving the valve to and from closing relation to said port.

8. In a control device for a pneumatic dispatch transmission tube, a valve casing having a partition member provided with a port, a cylindrical extension formed on the wall of said casing in alignment with the port, a valve member having the relation of a piston to said cylindrical extension and movable with an airtight fit therein, the outer end of said tubular extension being open whereby the outer end of the valve is exposed to atmospheric pressure, diaphragm means subject to pressure conditions in the tube for moving the valve member to open position, spring means associated with said diaphragm for moving the valve to closed position, said valve being arranged to provide for a minimum flow of air through the port when in closed position.

9. In a control device of the minimum flow type for a pneumatic dispatch system, a valve normaly in a nearly closed position, and pneumatic means made effective by the insertion of a carrier into the system for opening said valve, said valve being so designed that differential pressures exerted upon surfaces thereof in opposite directions normally hold said valve in its normal nearly closed position.

10. In a control device of the minimum flow type for a pneumatic dispatch system, a valve normally in a nearly closed position, and pneumatic means made effective by the insertion of a carrier into the system for opening said valve, said valve being generally cylindrical in form, its front end cooperating with its port and being normally at substantially atmospheric pressure, and its rear end being exposed to the atmosphere, the area of its front end being substantially less than the area of its rear end, and said valve being provided with a flange intermediate its ends representing the difference between the front and rear areas, said flange being exposed to a sub-atmospheric pressure, whereby said valve is normally held in its normal nearly closed position by the pressures acting thereon.

JOSEPH JOHN STOETZEL.